United States Patent
Nakamura

(10) Patent No.: US 11,959,417 B2
(45) Date of Patent: Apr. 16, 2024

(54) AMMONIA-FUELED GAS TURBINE

(71) Applicant: Tohoku University, Miyagi (JP)

(72) Inventor: Hisashi Nakamura, Miyagi (JP)

(73) Assignee: TOHOKU UNIVERSITY, Miyagi (JP)

(*) Notice: Subject to any disclaimer, the term of this patent is extended or adjusted under 35 U.S.C. 154(b) by 0 days.

(21) Appl. No.: 17/998,824

(22) PCT Filed: Sep. 25, 2020

(86) PCT No.: PCT/JP2020/036182
§ 371 (c)(1),
(2) Date: Nov. 15, 2022

(87) PCT Pub. No.: WO2021/234979
PCT Pub. Date: Nov. 25, 2021

(65) Prior Publication Data
US 2023/0212978 A1  Jul. 6, 2023

(30) Foreign Application Priority Data
May 18, 2020 (WO) .................. PCT/JP2020/019693

(51) Int. Cl.
F02C 3/30 (2006.01)
F02C 3/20 (2006.01)
F02C 3/22 (2006.01)
F02C 3/34 (2006.01)

(52) U.S. Cl.
CPC .................. F02C 3/30 (2013.01); F02C 3/20 (2013.01); F02C 3/22 (2013.01); F02C 3/34 (2013.01)

(58) Field of Classification Search
CPC ...... F02C 3/30; F02C 3/22; F02C 3/34; F02C 3/20
See application file for complete search history.

(56) References Cited

U.S. PATENT DOCUMENTS

| 1,988,456 A | 1/1935 | Lysholm |
| 5,272,867 A | 12/1993 | Emsperger |
| 2011/0138766 A1 | 6/2011 | ElKady |
| 2012/0047870 A1 | 3/2012 | Kasuga |
| 2014/0283498 A1 | 9/2014 | Horikawa |

(Continued)

FOREIGN PATENT DOCUMENTS

| DE | 4104382 A1 | 8/1992 |
| EP | 3604770 A1 | 3/2018 |
| JP | H09195793 A | 7/1997 |

(Continued)

OTHER PUBLICATIONS

International Search Report for corresponding PCT application No. PCT/JP2020/036182, dated Nov. 13, 2020.

(Continued)

Primary Examiner — Steven M Sutherland
(74) Attorney, Agent, or Firm — McDonnell Boehnen Hulbert & Berghoff LLP

(57) ABSTRACT

A gas turbine (A, B, C) is provided that includes at least a compressor (1), a combustor (2), and a turbine (3) and combusts ammonia serving as fuel in the combustor (2), including a reducing agent supply device (6) configured to supply a reducing agent for reducing nitrogen oxides in a combustion gas to at least one of: a combustion gas flow path between the combustor (2) and the turbine (3); and the turbine (3).

6 Claims, 5 Drawing Sheets

(56) References Cited

U.S. PATENT DOCUMENTS

2015/0184590 A1* 7/2015 Conlon .................. F25J 1/0012
                                                                60/772
2019/0078513 A1   3/2019 Lear, Jr.

FOREIGN PATENT DOCUMENTS

| | | | |
|---|---|---|---|
| JP | 2001234708 A | 8/2001 | |
| JP | 2011127602 A | 6/2011 | |
| JP | 2013096324 A | 5/2013 | |
| JP | 2015031215 A | 2/2015 | |
| JP | 2016191507 A | 11/2016 | |
| JP | 2018162752 A | 10/2018 | |
| JP | 2018162759 A | 10/2018 | |
| WO | 2010082360 A1 | 7/2010 | |
| WO | WO-2010082360 A1 * | 7/2010 | ................ F02C 3/20 |
| WO | 2017160154 A1 | 9/2017 | |
| WO | WO-2018143168 A1 * | 8/2018 | ............. B01D 53/90 |
| WO | WO-2018180781 A1 * | 10/2018 | ......... B01D 53/8631 |

OTHER PUBLICATIONS

International Search Report for corresponding PCT application No. PCT/JP2020/019693, dated Jul. 8, 2020.

* cited by examiner

AMMONIA-FUELED GAS TURBINE

TECHNICAL FIELD

The present invention relates to a gas turbine.

The present application is a U.S. National Phase Application pursuant to 35 U.S.C. § 371 of PCT International Application No. PCT/JP2020/036182 filed Sep. 25, 2020, which claims priority to PCT International Application No. PCT/JP2020/019693, filed May 18, 2020, the contents of each of which are incorporated herein by reference.

BACKGROUND ART

Patent Document 1 below discloses a combustion device and a gas turbine system in which natural gas and ammonia are co-combusted in a combustor. In the combustion device and the like, gaseous ammonia is mixed in and combusted in the combustor as combustion ammonia and is supplied to a downstream side of a turbine and an upstream side of a reduction catalyst chamber as reducing ammonia to reduce nitrogen oxides ($NO_x$) contained in a combustion gas.

Also, Patent Document 2 below discloses a reheating type ammonia gas turbine in which ammonia is combusted (mono-fuel-combusted) as a sole fuel in a main combustor and is supplied to a reheater to reduce a concentration of nitrogen oxides ($NO_x$) in an exhaust gas. In the gas turbine, the exhaust gas from the reheater is supplied to a reheat gas turbine via a denitrification catalyst.

CITATION LIST

Patent Document

[Patent Document 1]
Japanese Unexamined Patent Application, First Publication No. 2018-162752
[Patent Document 2]
Japanese Unexamined Patent Application, First Publication No. 2015-031215

SUMMARY OF INVENTION

Technical Problem

However, in each of the gas turbines described above, the reduction catalyst chamber or denitrification catalyst is used to reduce the concentration of nitrogen oxides in the combustion gas or exhaust gas, but ammonia is combusted as fuel, and thus generation of nitrogen oxides ($NO_x$) originating from nitrogen atoms contained in ammonia ($NH_3$) is inevitable. That is, a large-sized exhaust denitrification device is essential for an ammonia combustion type gas turbine.

However, enlargement in size of the exhaust denitrification device causes various problems such as problems in cost and space, reduction in overall efficiency, and deterioration in followability with respect to a load fluctuation. Accordingly, it is required to reduce the concentration of nitrogen oxides ($NO_x$) contained in the combustion gas at a stage in front of the exhaust denitrification device.

Also, ammonia does not generate carbon dioxide ($CO_2$) when combusted, but an amount of production of $CO_2$-free ammonia originating from renewable energy is limited, and thus its efficient use, that is, improvement of thermal efficiency is required. Although it is easy to improve thermal efficiency in a larger gas turbine, an amount of consumption of ammonia also increases in a larger gas turbine, and thus a larger gas turbine that consumes a large amount of $CO_2$-free ammonia, which is limited in production, is not suitable. Accordingly, measures for improving thermal efficiency of small and medium-sized gas turbines by taking advantage of characteristics of ammonia combustion are required.

The present disclosure has been made in view of the above-mentioned problems and aims to achieve the following.
(1) Making the concentration of nitrogen oxides ($NO_x$) meet emission standards without enlarging the size of an exhaust denitrification device.
(2) Improving thermal efficiency of a gas turbine that uses ammonia as fuel.

Solution to Problem

A gas turbine of a first aspect of the present disclosure is a gas turbine that includes at least a compressor, a combustor, and a turbine and combusts ammonia serving as fuel in the combustor, and includes a water vapor circulator configured to recover water vapor generated by combustion of ammonia to circulate and supply the water vapor to the combustor.

In the gas turbine of the first aspect of the present disclosure, the water vapor circulator may include a recovery device configured to recover the water vapor contained in an exhaust gas of the turbine as water, and a water vapor supply device configured to vaporize the water and supply it to the combustor, and may condense the water vapor and vaporize the water through heat exchange between the exhaust gas and the water.

In the gas turbine of the first aspect of the present disclosure, the recovery device may include a heat exchanger configured to cause the exhaust gas to exchange heat with the water, and a gas-liquid separator configured to perform gas-liquid separation of the water output from the heat exchanger from a residual gas of the exhaust gas, and the water vapor supply device may include a water pump configured to supply the water output from the gas-liquid separator to the heat exchanger, and a heat exchanger.

The gas turbine of the first aspect of the present disclosure may include a first mixer configured to mix at least a part of the water vapor supplied to the combustor by the water vapor supply device with the ammonia before being supplied to the combustor as fuel.

The gas turbine of the first aspect of the present disclosure may include a second mixer configured to mix at least a part of the ammonia before being supplied to the combustor as fuel with the water recovered by the recovery device.

The gas turbine of the first aspect of the present disclosure may include a reducing agent supplier configured to supply a part of the ammonia before being supplied to the combustor as fuel to the turbine as a reducing agent for reducing nitrogen oxides in the combustion gas.

A gas turbine according to a second aspect of the present disclosure is a gas turbine that includes at least a compressor, a combustor, and a turbine and combusts ammonia serving as fuel in the combustor, and includes a reducing agent supply device configured to supply a reducing agent for reducing nitrogen oxides in a combustion gas to at least one of: a combustion gas flow path between the combustor and the turbine; and the turbine.

In the gas turbine of the second aspect of the present disclosure, the turbine may be a multistage turbine in which a plurality of individual turbines are combined, and the reducing agent supply device may supply the reducing agent to at least one of: the individual turbines at stages at which a denitrification effect is expected; and the individual combustion gas flow paths connecting the individual turbines.

The gas turbine of the second aspect of the present disclosure may further include a cooling fluid supply device configured to supply a cooling fluid to the turbine, wherein the reducing agent may be mixed with the cooling fluid and supplied.

In the gas turbine of the second aspect of the present disclosure, the reducing agent may be ammonia.

Advantageous Effects of Invention

According to the present disclosure, it is possible to make the concentration of nitrogen oxides ($NO_x$) meet emission standards without enlarging the size of an exhaust denitrification device.

In addition, according to the present disclosure, it is possible to achieve improvement of thermal efficiency of a gas turbine that uses ammonia as fuel.

DESCRIPTION OF EMBODIMENTS

Embodiments of the present disclosure will be described below with reference to the drawings.

First Embodiment

Figure 1:
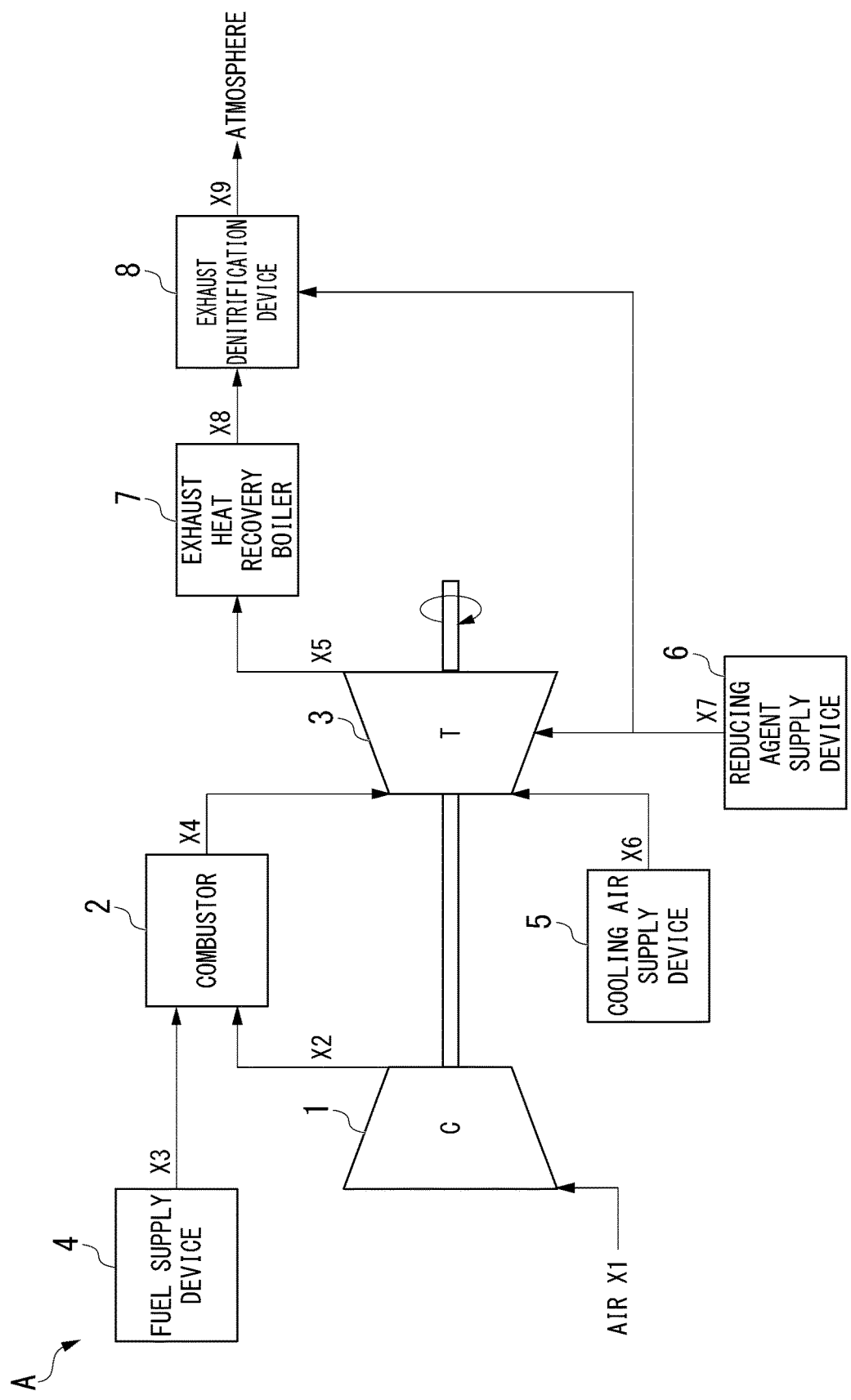
FIG. 1 is a system configuration diagram showing an overall configuration of a gas turbine according to a first embodiment of the present disclosure.

First, a first embodiment of the present disclosure will be described with reference to FIGS. 1 to 3. As shown in FIG. 1, a gas turbine A according to the first embodiment includes a compressor 1, a combustor 2, a turbine 3, a fuel supply device 4, a cooling air supply device 5, a reducing agent supply device 6, an exhaust heat recovery boiler 7, and an exhaust denitrification device 8. This gas turbine A is an ammonia mono-fuel-combustion type gas turbine in which ammonia supplied from the fuel supply device 4 is combusted (mono-fuel-combusted) in the combustor 2 as a sole fuel X3.

The compressor 1 is, for example, an axial-flow compressor that includes moving blades and stationary blades which are disposed alternately in multiple stages along a rotating shaft, and pressurizes air X1 taken from the atmosphere to a predetermined pressure and supplies it to the combustor 2.

The rotating shaft of the compressor 1 is axially coupled to a rotating shaft of the turbine 3 and is rotated by the turbine 3.

The combustor 2 has a burner that injects compressed air X2 supplied from the compressor 1 and the fuel X3 supplied from the fuel supply device 4 into a chamber, and combusts the fuel X3 using the compressed air X2 as an oxidant. The combustor 2 supplies the turbine 3 with a high-temperature and high-pressure combustion gas X4 generated through a combustion reaction of the fuel X3 as a driving fluid.

The turbine 3 is, for example, an axial-flow turbine that includes moving blades and stationary blades which are disposed alternately in multiple stages along the rotating shaft, and is a prime mover that converts kinetic energy of the combustion gas X4 (driving fluid) into power. The turbine 3 rotates the compressor 1 to which the rotating shaft is axially coupled by the power generated by the turbine 3 itself. Also, the turbine 3 includes an output shaft that is connected to a load and rotates the load.

Figure 2A:
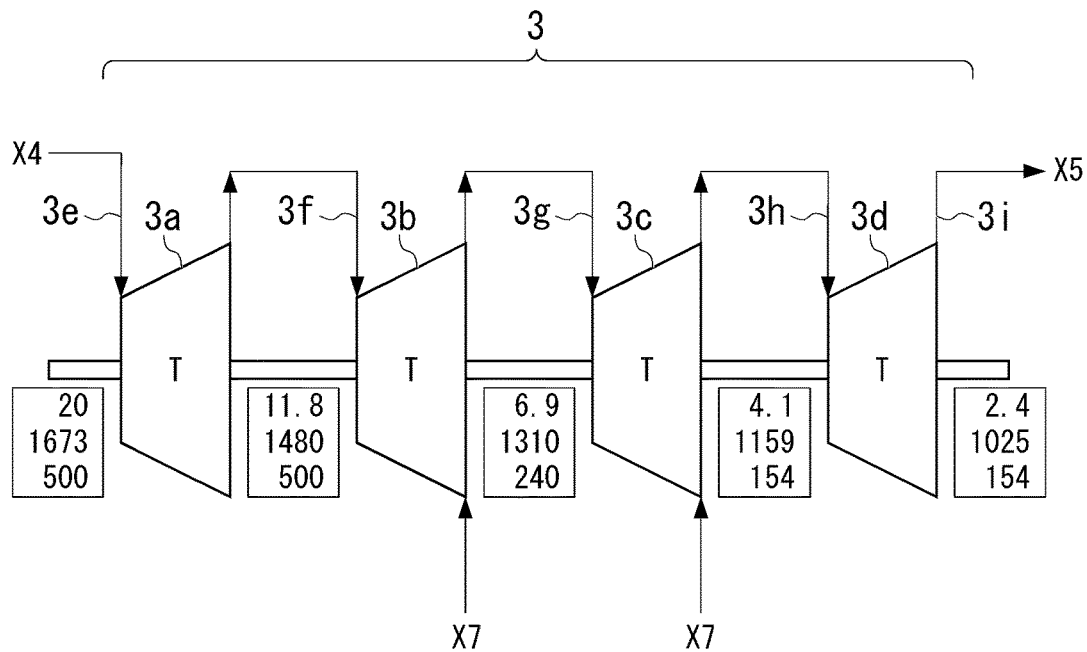
FIG. 2A is a first schematic diagram showing a turbine configuration and reducing agent injection points according to the first embodiment of the present disclosure.
Figure 2B:
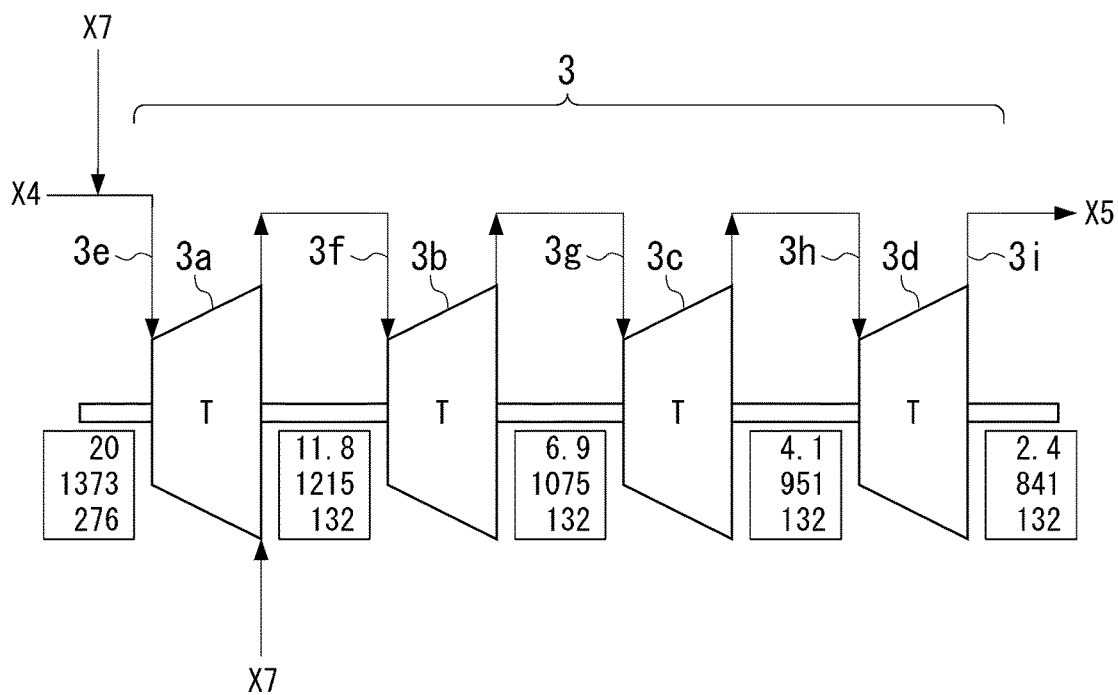
FIG. 2B is a second schematic diagram showing a turbine configuration and reducing agent injection points according to the first embodiment of the present disclosure.

As shown in FIGS. 2A and 2B, this turbine 3 is a multistage turbine that includes a plurality (four) of individual turbines 3a to 3d and five combustion gas flow paths 3e to 3i, in which these individual turbines 3a to 3d and combustion gas flow paths 3e to 3i are combined. The turbine 3 discharges an exhaust gas X5 after the power has been recovered by the individual turbines 3a to 3d of each stage to the exhaust heat recovery boiler 7.

Among the four individual turbines 3a to 3d, the individual turbine 3a is the first stage turbine located furthest upstream in a flow direction of the combustion gas X4. The individual turbine 3a has an inlet for the combustion gas X4, which is connected to an outlet of the combustor 2 via the combustion gas flow path 3e. Also, the individual turbine 3a has an outlet for the combustion gas X4, which is connected to an inlet of the individual turbine 3b via the combustion gas flow path 3f.

The individual turbine 3b is a second stage turbine located second upstream in the flow direction of the combustion gas X4. The individual turbine 3b has an inlet for the combustion gas X4, which is connected to an outlet of the individual turbine 3a via the combustion gas flow path 3f. Also, the individual turbine 3b has an outlet for the combustion gas X4, which is connected to an inlet of the individual turbine 3c via the combustion gas flow path 3g.

The individual turbine 3c is a third stage turbine located third upstream in the flow direction of the combustion gas X4. The individual turbine 3c has an inlet for the combustion gas X4, which is connected to an outlet of the individual turbine 3b via the combustion gas flow path 3g. Also, the individual turbine 3c has an outlet for the combustion gas X4, which is connected to an inlet of the individual turbine 3d via the combustion gas flow path 3h.

The individual turbine 3d is a fourth stage turbine located furthest downstream in the flow direction of the combustion gas X4. The individual turbine 3d has an inlet for the combustion gas X4, which is connected to an outlet of the individual turbine 3c via the combustion gas flow path 3h. Also, the individual turbine 3d has an outlet for the combustion gas X4, which is connected to an inlet of the exhaust heat recovery boiler 7 via the combustion gas flow path 3i.

The fuel supply device 4 includes at least a fuel tank and a fuel pump, and supplies the fuel X3 to the combustor 2 at a predetermined flow rate. More specifically, the fuel supply device 4 supplies ammonia to the combustor 2 as the sole fuel X3. Also, as is well known, ammonia is generally distributed as a liquefied gas. The fuel supply device 4 receives the ammonia as the fuel X3 from the outside and supplies it to the combustor 2.

The cooling air supply device 5 includes at least an air compressor and supplies cooling air X6 to the turbine 3 as a cooling fluid. The cooling air X6 is supplied to the inside of the moving blades, the stationary blades, and the like that constitute the turbine 3 and flows from the inside to the outside, thereby inhibiting fatigue deterioration of the turbine 3 exposed to the high-temperature combustion gas. Such a cooling air supply device 5 corresponds to the cooling fluid supply device of the present disclosure.

The reducing agent supply device 6 includes at least a reducing agent tank and a reducing agent pump, and supplies a reducing agent X7 at a predetermined flow rate to the turbine 3 and the exhaust denitrification device 8. The reducing agent X7 is a substance that can be expected to reduce nitrogen oxides ($NO_x$) contained in the combustion gas and is ammonia, for example. More specifically, the reducing agent supply device 6 selectively supplies the reducing agent X7 to at least one of: any of the individual turbines 3a to 3d; and the combustion gas flow paths 3e to 3i.

That is, the reducing agent supply device 6 supplies the reducing agent X7 to at least one of the individual turbines; and the individual combustion gas flow paths at stages at which a denitrification effect is expected, among at least one of: the combustion gas flow path between the combustor 2 and the turbine 3; and the turbine 3. Such a reducing agent supply device 6 corresponds to the reducing agent supply device of the present disclosure.

The exhaust heat recovery boiler 7 is a water vapor generator that includes at least a gas circulation pipe through which the exhaust gas X5 flows and a water circulation pipe through which water flows, and generates water vapor using the exhaust gas X5 supplied from the turbine 3 as a heat source. The exhaust heat recovery boiler 7 discharges the exhaust gas X8 after exhaust heat recovery to the exhaust denitrification device 8.

The exhaust denitrification device 8 includes at least a catalyst chamber filled with a denitrification catalyst and a sprayer for spraying the reducing agent X7 at a stage in front of the denitrification catalyst, and causes the exhaust gas X8 together with the reducing agent X7 to flow to the denitrification catalyst, thereby decomposing nitrogen oxides ($NO_x$) contained in the exhaust gas X8. The exhaust denitrification device 8 releases the exhaust gas X9, in which a concentration of nitrogen oxides has been reduced to meet environmental standards, into the atmosphere.

Such an exhaust denitrification device 8 has the characteristic that a device scale is enlarged depending on at least one of: a flow rate of the exhaust gas X8; and the concentration of nitrogen oxides contained in the exhaust gas X8. That is, in the exhaust denitrification device 8, when the flow rate of the exhaust gas X8 increases, the device size increases in order to make the exhaust gas X9 meet environmental standards, and when the concentration of nitrogen oxides in the exhaust gas X8 increases, the device scale increases in order to make the exhaust gas X9 meet environmental standards.

Accordingly, in order to inhibit the enlargement of the exhaust denitrification device 8, it is required to sufficiently reduce the concentration of nitrogen oxides at a stage in front of the exhaust denitrification device 8, that is, in a part between the combustor 2 and the exhaust heat recovery boiler 7, through which the combustion gas X4 or the exhaust gas X5, X8, and X9 flows.

Next, operations of the gas turbine A according to the first embodiment will be described in detail with reference to FIG. 3.

Figure 3:
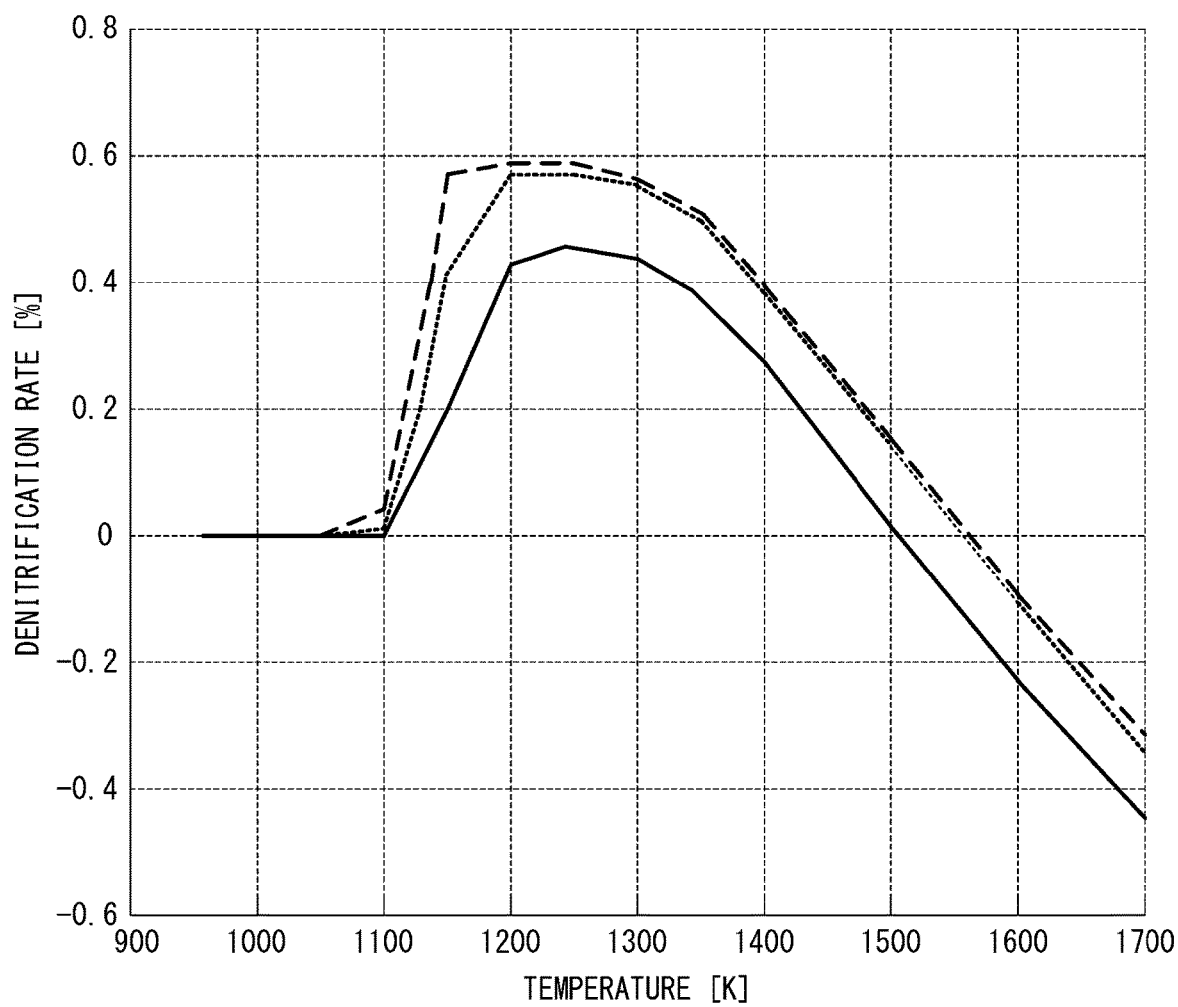
FIG. 3 is a graph showing simulation results of a denitrification rate according to the first embodiment of the present disclosure.

FIG. 3 shows results of simulating a change in denitrification rate relative to a temperature (K) and a pressure (bar) in a presence field (reduction field) of the reducing agent X7 in the combustion gas X4 generated in the combustor 2 when ammonia (fuel X3) is mono-fuel-combusted. Also, in FIG. 3, the solid line represents the case in which the pressure is 1 bar, the dotted line represents the case in which the pressure is 10 bar, and the dashed line represents the case in which the pressure is 20 bar.

More specifically, the combustion gas X4 is a mixed gas containing 17% oxygen ($O_2$), 6% water vapor ($H_2O$), and 500 ppm nitrogen monoxide (NO) in nitrogen ($N_2$). In this simulation, the change in denitrification rate was determined in a case in which 500 ppm of ammonia ($NH_3$), which is the same amount as that of nitrogen monoxide (NO), was converted into the combustion gas X4. In addition, as is well known, 1 bar is 0.1 MPa (megapascals).

These simulation results show that the denitrification rate becomes higher as the pressure increases, and that the denitrification rate takes a positive value in a predetermined temperature range, and the denitrification rate takes a negative value in a temperature range exceeding that range. In other words, these simulation results show that the concentration of nitrogen oxides decreases in the temperature range from about 1100° C. to about 1500° C., and the concentration of nitrogen oxides conversely increases in the temperature range exceeding around 1500° C.

The gas turbine A according to the first embodiment has been made in view of such simulation results, and as shown in FIGS. 2A and 2B, the reducing agent supply device 6 supplies the reducing agent X7 to locations in the turbine 3 at which the denitrification rate can take a positive value.

FIG. 2A shows a case in which the gas turbine A according to the first embodiment is applied to a relatively large gas turbine. In this case, properties of the combustion gas X4 at the outlet of the combustor 2 are pressure: 20 bar, temperature: 1673 K, and concentration of nitrogen oxides: 500 ppm. Further, in a case in which a turbine expansion coefficient of each of the individual turbines 3a to 3d is set to 1.7, the pressures, the temperatures, and the concentrations of nitrogen oxides at the inlets and the outlets of each of the individual turbines 3a to 3d have the numerical values as shown in the upper and lower three rows.

That is, the pressure at the inlet of the first stage individual turbine 3a is the same as at the outlet of the combustor 2, that is, pressure: 20 bar, temperature: 1673 K, and concentration of nitrogen oxides: 500 ppm, and the pressure at the outlet of the first stage individual turbine 3a and the inlet of the second stage individual turbine 3b is pressure: 11.8 bar, and temperature: 1480 K.

In addition, the pressure at the outlet of the second stage individual turbine 3b and the inlet of the third stage individual turbine 3c is pressure: 6.9 bar, and temperature: 1310 K, and the pressure at the outlet of the third stage individual turbine 3c and the inlet of the fourth stage individual turbine 3d is pressure: 4.1 bar, and temperature: 1159 K, and the pressure at the outlet of the fourth stage individual turbine 3d is pressure: 2.4 bar, and temperature: 1025 K.

Among the pressures and temperatures at the inlets and outlets of the individual turbines 3a to 3d, the locations satisfying the condition that the denitrification rate takes a positive value are the outlet of the second stage individual turbine 3b, the inlet of the third stage individual turbine 3c, the outlet of the third stage individual turbine 3c, and the inlet of the fourth stage individual turbine 3d.

That is, as illustrated, the reducing agent supply device 6 according to the first embodiment supplies the reducing agent X7 to the outlet of the second stage individual turbine 3b and the outlet of the third stage individual turbine 3c. As a result, the concentration of nitrogen oxides at the inlet of the third stage individual turbine 3c is reduced to 240 ppm, and the concentration of nitrogen oxides at the inlet of the fourth stage individual turbine 3d is reduced to 154 ppm.

According to the first embodiment, it is possible to secure a total denitrification rate of about 69% for a relatively large gas turbine, and the concentration of nitrogen oxides of 154 ppm is a level that can be processed by the normal scale exhaust denitrification device 8. Accordingly, according to the first embodiment, it is possible to make the concentration of nitrogen oxides ($NO_x$) meet emission standards for a relatively large gas turbine without enlarging the size of the exhaust denitrification device 8.

Also, FIG. 2B shows a case in which the gas turbine A according to the first embodiment is applied to a small or medium-sized gas turbine. In this case, the properties of the combustion gas X4 at the outlet of the combustor 2 are pressure: 20 bar, temperature: 1373 K, and concentration of nitrogen oxides: 500 ppm. Further, in the case in which the turbine expansion coefficient of each of the individual turbines 3a to 3d is set to 1.7, the pressures, the temperatures, and the concentrations of nitrogen oxides at the inlets and outlets of each of the individual turbines 3a to 3d have the numerical values as shown in the upper and lower three rows.

That is, the pressure at the inlet of the first stage individual turbine 3a is the same as at the outlet of the combustor 2, that is, pressure: 20 bar, temperature: 1373 K, and concentration of nitrogen oxides: 500 ppm, and the pressure at the outlet of the first stage individual turbine 3a and the inlet of the second stage individual turbine 3b is pressure: 11.8 bar, and temperature: 1215 K.

Also, the pressure at the outlet of the second stage individual turbine 3b and the inlet of the third stage individual turbine 3c is pressure: 6.9 bar, and temperature: 1075 K, the pressure at the outlet of the third stage individual turbine 3c and the inlet of the fourth stage individual turbine 3d is pressure: 4.1 bar, and temperature: 951 K, and the pressure at the outlet of the fourth stage individual turbine 3d is pressure: 2.4 bar, and temperature: 841 K.

Among the pressures and temperatures at the inlets and outlets of the individual turbines 3a to 3d, the locations satisfying the condition that the denitrification rate takes a positive value are the outlet of the combustor 2, the inlet of the first stage individual turbine 3a, the outlet of the first stage individual turbine 3a, and the inlet of the second stage individual turbine 3b.

Accordingly, as illustrated, the reducing agent supply device 6 supplies the reducing agent X7 to the outlet of the combustor 2 and the outlet of the first stage individual turbine 3a. As a result, the concentration of nitrogen oxides at the inlet of the first stage individual turbine 3a is reduced to 276 ppm and the concentration of nitrogen oxides at the inlet of the second stage individual turbine 3b is reduced to 132 ppm.

According to the first embodiment, it is possible to secure a total denitrification rate of about 74% for small and medium-sized gas turbines, and the concentration of nitrogen oxides of 132 ppm is a level that can be processed by the normal scale exhaust denitrification device 8. Accordingly, according to the first embodiment, it is possible to make the concentration of nitrogen oxides ($NO_x$) meet emission standards without enlarging the size of the exhaust denitrification device 8 even in small and medium-sized gas turbines.

In addition, according to the first embodiment, since ammonia can be used in common for the fuel X3 and the reducing agent X7, it is possible to simplify a device configuration. Further, since ammonia, which has excellent cooling capacity, is supplied to the turbine 3 as the reducing agent X7, the cooling capacity of the turbine 3 can be improved.

Second Embodiment

Next, a second embodiment of the present disclosure will be described with reference to FIG. 4.

Figure 4:
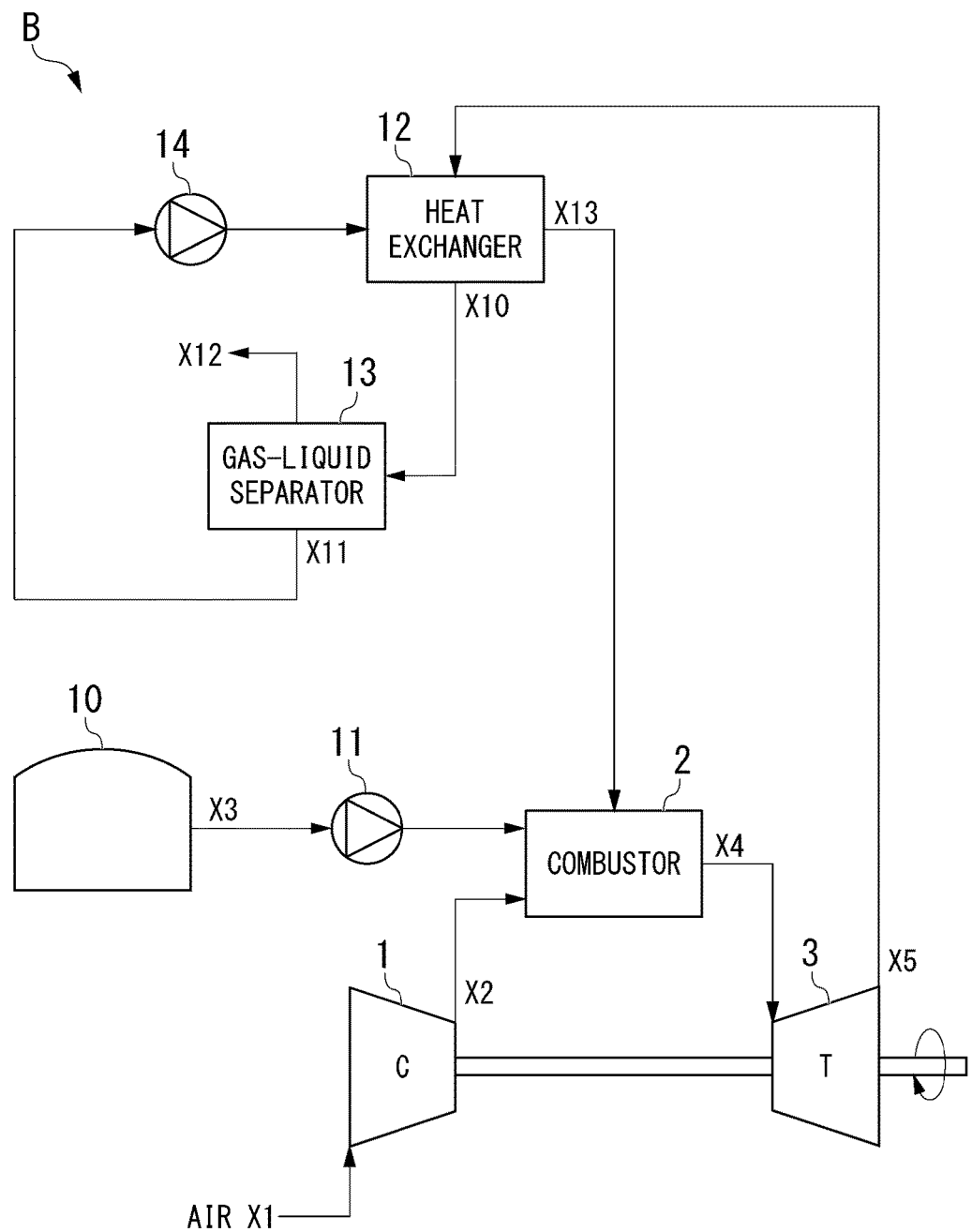
FIG. 4 is a system configuration diagram showing an overall configuration of a gas turbine according to a second embodiment of the present disclosure.

Also, in FIG. 4, the same functional constituent elements as those in FIG. 1 described above will be denoted by the same reference numerals.

As shown in FIG. 4, a gas turbine B according to the second embodiment includes a heat exchanger 12, a gas-liquid separator 13, and a water pump 14 in addition to the compressor 1, the combustor 2, the turbine 3, and the fuel supply device 4. The fuel supply device 4 has a fuel tank 10 and a fuel pump 11. The heat exchanger 12, the gas-liquid separator 13, and the water pump 14, which are new functional constituent elements, constitute a water vapor circulator of the present disclosure, and recover the water vapor generated due to combustion of ammonia, which is the fuel X3, to circulate and supply it to the combustor 2.

As shown in the following formula (1), the combustion gas X4 generated by a combustion reaction of ammonia contains a large amount of moisture. The gas turbine B according to the second embodiment utilizes such a characteristic of the combustion reaction of ammonia to improve thermal efficiency.

$$4NH_4 + 3O_2 \rightarrow 2N_2 + 6H_2O \qquad (1)$$

The heat exchanger 12 causes the exhaust gas X5 supplied from the turbine 3 to exchange heat with water X11 supplied from the water pump 14, thereby selectively condensing the water vapor contained in the exhaust gas X5 to generate gas-liquid mixed water X10 and vaporizing the water X11 into water vapor X13. The heat exchanger 12 supplies the gas-liquid mixed water X10 to the gas-liquid separator 13 and supplies the water vapor X13 to the combustor 2.

The gas-liquid separator 13 performs gas-liquid separation of the gas-liquid mixed water X10 to separate it into the water X11 and a residual gas X12 other than the water X11 in the gas-liquid mixed water X10. The gas-liquid separator 13 supplies the water X11 to the water pump 14 and discharges the residual gas X12 to a subsequent exhaust heat recovery boiler or an exhaust denitrification device (not shown).

That is, the heat exchanger 12 and the gas-liquid separator 13 constitute the recovery device of the present disclosure and recover the water vapor contained in the exhaust gas X5 of the turbine 3, that is, the water vapor generated due to the combustion of ammonia as the water X11.

The water pump 14 pressurizes the water X11 supplied from the gas-liquid separator 13 and supplies it to the heat exchanger 12. The water X11 is heated in the heat exchanger 12 to be vaporized into the water vapor X13 and supplied to the combustor 2. That is, the heat exchanger 12 and the water pump 14 constitute the water vapor supply device of the present disclosure that vaporizes the water X11 and supplies it to the combustor 2.

In a case in which the gas turbine B configured in this way is applied to a small or medium-sized gas turbine with an output of 11 MW, the total thermal efficiency obtained through a simulation is 35.7%. The conditions in this simulation are as follows.

(1) Fuel X3 (ammonia) supply amount: 123 kmol/h
(2) Fuel (ammonia) supply temperature: normal temperature
(3) Fuel (ammonia) supply pressure: 10 atm
(4) Inlet temperature of turbine 3: 1100° C.
(5) Inlet pressure of turbine 3: 20 atm In addition, as a result of this simulation, the power of the fuel supply device 4 (supply pump power) obtained with the thermal efficiency (35.7%) is 1 kW, the power of the water pump 14 is 6 kW, the power of the compressor 1 is 2281 kW (air flow rate: 600 kmol/h), the power of the turbine 3 is 6156 kW, and the net power is 3867 kW.

In contrast to such simulation results, when calculating the thermal efficiency of a gas turbine in which the heat exchanger 12, the gas-liquid separator 13, and the water pump 14, that is, the water vapor circulator of the present disclosure is removed from the gas turbine B, and a heat exchanger that causes the exhaust gas X5 to exchange heat with the fuel X3 (ammonia) is added thereto, the result becomes 29.0%. Also, simulation conditions in this case are substantially the same as those in the case of the gas turbine B described above, but the inlet temperature of the turbine 3 is 1400° C.

Further, as a result of this simulation, the power of the fuel supply device 4 (supply pump power) obtained with the thermal efficiency (29.0%) is 1 kW, the power of the compressor 1 is 4068 kW (air flow rate: 1070 kmol/h), the output of the turbine 3 is 7207 kW, and the net output is 3138 kW.

That is, according to the gas turbine B of the second embodiment, since the water vapor generated by the combustion of the fuel X3 (ammonia) is recovered, circulated and supplied to the combustor 2, it is possible to improve the thermal efficiency in the case in which ammonia is used as the fuel X3.

In addition, according to the gas turbine B, since the water vapor X13 is supplied to the combustor 2, it is possible to lower the temperature of the combustion gas X4, and thus corrosion of the turbine 3 can be inhibited. Further, according to the gas turbine B, since the water vapor X13 is similarly supplied to the combustor 2, it is possible to reduce an amount of air supplied to the combustor 2, and thus the power of the compressor 1 can be reduced.

Third Embodiment

Next, a third embodiment of the present disclosure will be described with reference to FIG. 5.

Figure 5:
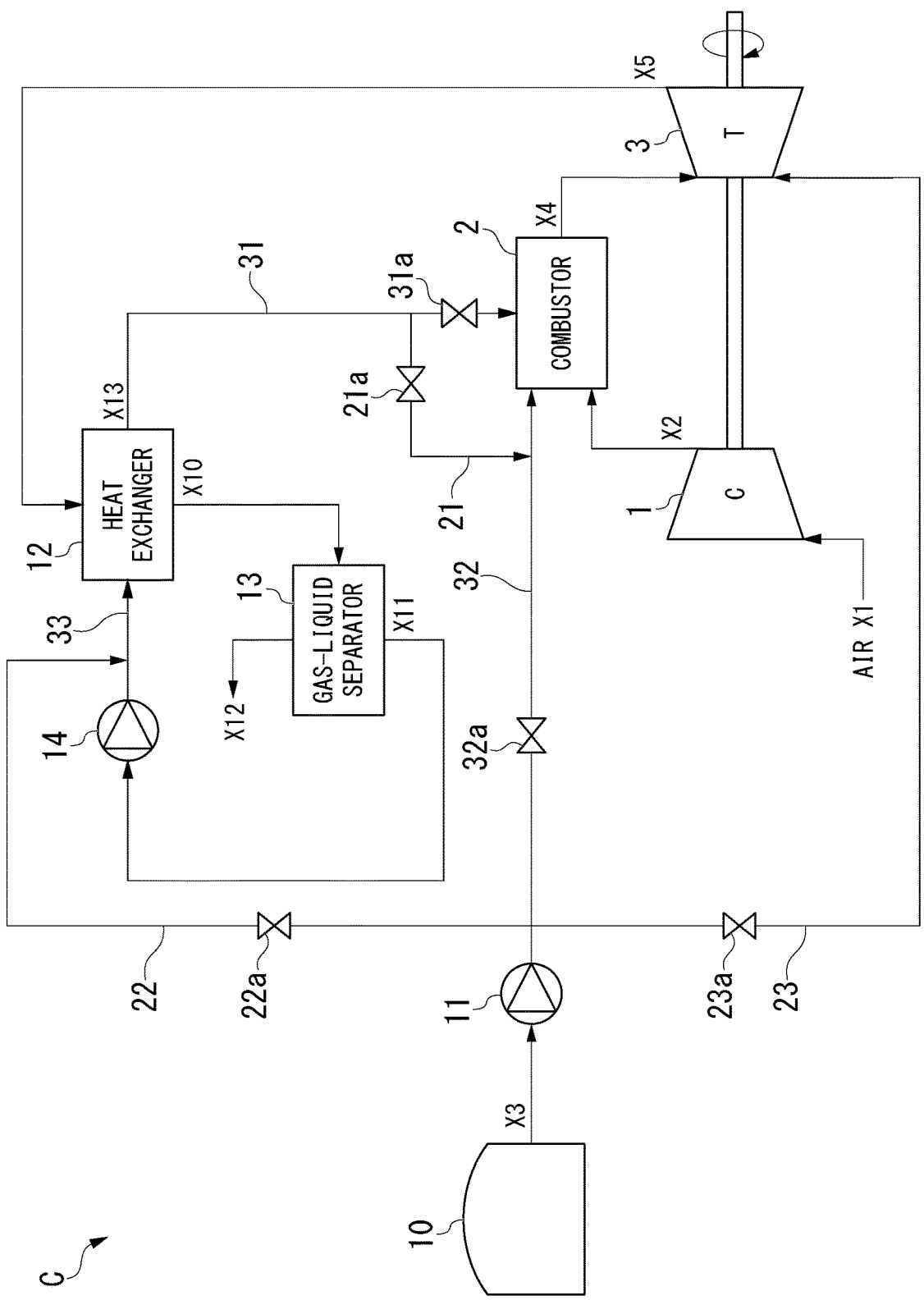
FIG. 5 is a system configuration diagram showing an overall configuration of a gas turbine according to a third embodiment of the present disclosure.

Also, in FIG. 5, the same functional constituent elements as those in FIG. 4 described above will be denoted by the same reference numerals.

As shown in FIG. 5, a gas turbine C according to the third embodiment includes a first mixing pipe 21, a second mixing pipe 22, and a reducing agent supply pipe 23 in addition to the compressor 1, the combustor 2, the turbine 3, the fuel supply device 4, the heat exchanger 12, the gas-liquid separator 13, and the water pump 14. Also, the first mixing pipe 21, the second mixing pipe 22, and the reducing agent supply pipe 23, which are new functional components, may be added individually to the gas turbine B shown in FIG. 4. That is, only the first mixing pipe 21 may be added to the gas turbine B in FIG. 4. Also, only the second mixing pipe 22 may be added to the gas turbine B in FIG. 4. Alternatively, only the reducing agent supply pipe 23 may be added to the gas turbine B in FIG. 4.

The first mixing pipe 21 is a branch pipe that is branched from a water vapor supply pipe 31 connecting the heat exchanger 12 to the combustor 2 and connected to a fuel supply pipe 32 connecting the fuel pump 11 to the combustor 2. The first mixing pipe 21 and the water vapor supply pipe 31 are provided with flow control valves 21a and 31a that can adjust an amount of distribution of water vapor between 0% and 100% in accordance with various loads of the gas turbine C. This first mixing pipe 21 corresponds to the first mixer of the present disclosure, which mixes at least a part of the water vapor supplied to the combustor 2 by the water vapor supply device with ammonia before being supplied to the combustor 2 as the fuel X3.

The second mixing pipe 22 is a branch pipe that is branched from the fuel supply pipe 32 connecting the fuel pump 11 to the combustor 2 and connected to a water supply pipe 33 connecting the water pump 14 to the heat exchanger 12. The second mixing pipe 22 and the fuel supply pipe 32 are provided with flow control valves 22a and 32a that can adjust an amount of distribution of ammonia between 0% and 100% in accordance with various loads of the gas turbine C. This second mixing pipe 22 corresponds to the second mixer of the present disclosure, which mixes at least a part of the ammonia before being supplied to the combustor 2 as the fuel X3 with the water recovered by the recovery device.

The reducing agent supply pipe 23 is a branch pipe that is branched from the fuel supply pipe 32 connecting the fuel pump 11 to the combustor 2 and connected to the turbine 3. The reducing agent supply pipe 23 is provided with a flow control valve 23a that can adjust a flow rate of ammonia. Also, a connection position of the reducing agent supply pipe 23 with the turbine 3 may be the same as a connection position of the reducing agent supply device 6 of the first embodiment described above with the turbine 3. This reducing agent supply pipe 23 corresponds to the reducing agent supplier of the present disclosure, which supplies a part of the ammonia before being supplied to the combustor 2 as the fuel X3 to the turbine 3 as a reducing agent for reducing nitrogen oxides in the combustion gas.

According to the first mixing pipe 21, liquid ammonia serving as the fuel X3 and the recovered water vapor are gas-liquid mixed, and the liquid ammonia that has absorbed the water vapor can be supplied to the combustor 2. Since ammonia mixes very well with water, the liquid ammonia can be mixed with the recovered water vapor. Since the liquid ammonia serving as the fuel X3 contains moisture, its calorific value is reduced, and a local flame temperature during combustion in the combustor 2 is reduced. For this reason, it is possible to reduce the generation of $NO_x$ in the combustor 2, which is a problem in the combustion of ammonia. Further, the liquid ammonia serving as the fuel X3 is mixed with the recovered water vapor to generate heat of dissolution, which preheats the fuel X3. For this reason, thermal efficiency of the gas turbine C can be improved.

In addition, according to the second mixing pipe 22, the liquid ammonia serving as the fuel X3 is mixed with the recovered water and passed through the heat exchanger 12, so that it can be supplied to the combustor 2 via the fuel supply pipe 32. Since ammonia mixes very well with water, the liquid ammonia can be mixed with the recovered water. Since the liquid ammonia serving as the fuel X3 contains moisture, its calorific value is reduced, and a local flame temperature during combustion in the combustor 2 is reduced. For this reason, it is possible to reduce the generation of $NO_x$ in the combustor 2, which is a problem in the combustion of ammonia. Further, the liquid ammonia serving as the fuel X3 is mixed with the recovered water to generate heat of dissolution, which preheats the fuel X3. The heat of dissolution due to this liquid-liquid mixing is more effective than the heat of dissolution due to the gas-liquid mixing described above. Further, the liquid ammonia serving as the fuel X3 passes through the heat exchanger 12, so that the fuel X3 can be preheated and vaporized. These can improve the thermal efficiency of the gas turbine C.

Further, according to the reducing agent supply pipe 23, the liquid ammonia serving as the fuel X3 and the liquid ammonia serving as the reducing agent X7 (denitrification agent) shown in FIG. 1 described above can be shared. For this reason, there is no need to install the reducing agent supply device 6 separately, and it is possible to prevent an increase in device scale.

Also, the present disclosure is not limited to the above embodiments, and for example, the following modified examples are conceivable.

(1) In each of the above embodiments, the ammonia mono-fuel-combustion type gas turbines A and B have been described, but the present disclosure is not limited thereto. The present disclosure is also applicable to ammonia co-combustion type gas turbines in which ammonia is co-combusted with other fuel.

(2) In each of the above embodiments, use of the gas turbines A and B has not been described, but the gas turbines A and B are used for power generation, for example. That is, the output shaft of the turbine 3 is connected to a rotating shaft of a generator, and the power of the turbine 3 drives the generator.

(3) In the first embodiment, the case in which the turbine 3 includes four (four stages) individual turbines 3a to 3d has been described, but the present disclosure is not limited thereto. The number of stages (the number) of individual turbines may be, for example, a two-stage configuration consisting of a high-pressure turbine and a low-pressure turbine.

(4) In the first embodiment, the reducing agent X7 and the cooling air X6 (cooling fluid) have been separately supplied to the turbine 3, but the present disclosure is not limited thereto. For example, the cooling air X6 may be mixed with the reducing agent X7 and supplied to the turbine 3. In this case, it is conceivable to use an ejector provided with a discharge nozzle for the reducing agent X7 in a flow path of the cooling air X6. By using such an ejector, kinetic energy of the cooling air X6 can be used to supply the reducing agent X7 to the turbine 3, so that the power for supplying the reducing agent X7 can be reduced.

(5) In the first embodiment, ammonia has been used as the reducing agent X7, but the present disclosure is not limited thereto. Any substance other than ammonia may be used as long as it exhibits a reducing action on nitrogen oxides.

(6) In the second embodiment, the water vapor circulator including the heat exchanger 12, the gas-liquid separator 13, and the water pump 14 has been adopted, but the present disclosure is not limited thereto. Further, it is also possible to mix water supplied by a system separate from the water vapor circulator with the gas (ammonia, etc.).

INDUSTRIAL APPLICABILITY

The present disclosure can be used for gas turbines.

REFERENCE SIGNS LIST

A, B, C Gas turbine
1 Compressor
2 Combustor
3 Turbine
3a to 3d Individual turbines
3e to 3i Combustion gas flow path
4 Fuel supply device
5 Cooling air supply device
6 Reducing agent supply device
7 Exhaust heat recovery boiler
8 Exhaust denitrification device
10 Fuel tank
11 Fuel pump
12 Heat exchanger
13 Gas-liquid separator
14 Water pump
21 First mixing pipe
22 Second mixing pipe
23 Reducing agent supply pipe

The invention claimed is:

1. A gas turbine that includes at least a compressor, a combustor, and a turbine and combusts ammonia serving as fuel in the combustor, comprising:
   a water vapor circulator configured to recover water vapor generated by combustion of the ammonia to circulate and supply the water vapor to the combustor,
   wherein the water vapor circulator includes:
      a heat exchanger that condenses the water vapor contained in exhaust gas discharged from the turbine;
      a gas-liquid separator that separates water condensed by the heat exchanger and residual gas of the exhaust gas; and
      a water pump that supplies the water separated by the gas-liquid separator to the heat exchanger,
   wherein the heat exchanger vaporizes the water supplied from the water pump by heat exchange with the exhaust gas and supplies the water vapor to the combustor, and wherein the gas turbine further comprises a first mixer configured to mix at least a part of the ammonia before being supplied to the combustor as the fuel with the water supplied from the water pump to the heat exchanger.

2. The gas turbine according to claim 1, further comprising a second mixer configured to mix at least a part of the water vapor supplied to the combustor by the water vapor circulator with the ammonia before being supplied to the combustor as the fuel.

3. The gas turbine according to claim 1, further comprising a reducing agent supplier configured to supply a part of the ammonia before being supplied to the combustor as the fuel to the turbine as a reducing agent for reducing nitrogen oxides in the combustion gas.

4. A gas turbine that includes at least a compressor, a combustor, and a turbine and combusts ammonia serving as fuel in the combustor, comprising:
   a reducing agent supply device configured to supply a reducing agent for reducing nitrogen oxides in a combustion gas to a combustion gas flow path between the combustor and the turbine.

5. The gas turbine according to claim 4, further comprising a cooling fluid supply device configured to supply a cooling fluid to the turbine, wherein
the reducing agent is mixed with the cooling fluid and supplied.

6. The gas turbine according to claim 4, wherein the reducing agent is ammonia.

* * * * *